United States Patent
Wu et al.

(10) Patent No.: US 9,654,304 B2
(45) Date of Patent: May 16, 2017

(54) METHOD AND APPARATUS FOR SENDING TRANSPARENT INTERCONNECTION OF LOTS OF LINKS DATA FRAME

(71) Applicant: Huawei Technologies Co., Ltd., Shenzhen (CN)

(72) Inventors: Xiaomin Wu, Shenzhen (CN); Weiguo Hao, Nanjing (CN); Haotao Pan, Nanjing (CN); Li Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 14/714,764

(22) Filed: May 18, 2015

(65) Prior Publication Data

US 2015/0249550 A1   Sep. 3, 2015

Related U.S. Application Data

(63) Continuation of application No. PCT/CN2013/073988, filed on Apr. 10, 2013.

(30) Foreign Application Priority Data

Nov. 19, 2012 (CN) .......................... 2012 1 0468141

(51) Int. Cl.
H04L 12/46 (2006.01)
H04L 12/721 (2013.01)

(52) U.S. Cl.
CPC ........ *H04L 12/4641* (2013.01); *H04L 12/462* (2013.01); *H04L 12/4687* (2013.01); *H04L 45/66* (2013.01)

(58) Field of Classification Search
CPC ..... H04L 45/66; H04L 45/68; H04L 12/4641; H04L 12/462; H04L 12/4687
See application file for complete search history.

(56) References Cited

U.S. PATENT DOCUMENTS 8,605,626 B2 * 12/2013 Balasubramanian H04L 12/4641
370/256
8,625,594 B2 * 1/2014 Safrai .................... H04L 49/35
370/392

(Continued)

FOREIGN PATENT DOCUMENTS

CN    101616014 A    12/2009
CN    102075446 A    5/2011

(Continued)

OTHER PUBLICATIONS

Partial English Translation and Abstract of Chinese Patent Application No. CN101616014A, Part 1, May 8, 2015, 6 pages.

(Continued)

*Primary Examiner* — Luat Phung
*Assistant Examiner* — Thomas R Cairns
(74) *Attorney, Agent, or Firm* — Blakely, Sokoloff, Taylor & Zafman LLP

(57) ABSTRACT

A method for sending a Transparent Interconnection of Lots of Links (TRILL) data frame, comprising acquiring a user virtual local area network (VLAN) or a combination of a user VLAN and a user multicast medium access control (MAC) address in a first protocol packet, and a first port identifier; storing a correspondence there-between in a forwarding table; searching, according to the user VLAN or the combination of the user VLAN and the user multicast MAC address in a TRILL data frame received, the forwarding table for a second port identifier corresponding to the VLAN or the combination of the user VLAN and the user multicast MAC address in the TRILL data frame, and forwarding the TRILL data frame from a pseudo wire (PW) port corresponding to the second port identifier.

8 Claims, 8 Drawing Sheets

(56) References Cited

U.S. PATENT DOCUMENTS

| | | | |
|---|---|---|---|
| 9,100,215 B2 * | 8/2015 | Narasimhan | |
| 2011/0299536 A1 | 12/2011 | Cheng et al. | |
| 2012/0177042 A1 | 7/2012 | Berman | |
| 2012/0177043 A1 | 7/2012 | Berman | |
| 2012/0218994 A1 | 8/2012 | Zheng | |

FOREIGN PATENT DOCUMENTS

| | | |
|---|---|---|
| CN | 102244614 A | 11/2011 |
| CN | 102647324 A | 8/2012 |
| EP | 2670088 A1 | 4/2013 |

OTHER PUBLICATIONS

Partial English Translation and Abstract of Chinese Patent Application No. CN101616014A, Part 2, May 8, 2015, 3 pages.
Foreign Communication From a Counterpart Application, European Application No. 13855587.5, Extended European Search Report dated Jul. 1, 2015, 5 pages.
Foreign Communication From a Counterpart Application, PCT Application No. PCT/CN2013/073988, English Translation of International Search Report dated Aug. 29, 2015, 3 pages.
Foreign Communication From a Counterpart Application, PCT Application No. PCT/CN2013/073988, English Translation of Written Opinion dated Aug. 29, 2015, 7 pages.

\* cited by examiner

```
+-+-+-+-+-+-+-+-+
|Type = INT-VLAN|                                    (1 byte)
+-+-+-+-+-+-+-+-+
|    Length     |                                    (1 byte)
+-+-+-+-+-+-+-+-+-+-+-+-+-+-+-+-+
|    Nickname                   |                    (2 bytes)
+-+-+-+-+-+-+-+-+-+-+-+-+-+-+-+-+-+-+-+-+-+-+-+-+...+-+-+-+-+
|    Interested VLANS                                   |    (4 bytes)
+-+-+-+-+-+-+-+-+-+-+-+-+-+-+-+-+-+-+-+-+-+-+-+-+...+-+-+-+-+
|    Appointed Forwarder Status Lost Counter            |    (4 bytes)
+-+-+-+-+-+-+-+-+-+-+-+-+-+-+-+-+-+-+-+-+-+-+-+-+...+-+-+-+-+
|              Root Bridges                             |    (6*n bytes)
+-+-+-+-+-+-+-+-+-+-+-+-+-+-+-+-+-+-+-+-+-+-+-+-+...+-+-+-+-+
```

FIG. 3A

```
+-+-+-+-+-+-+-+-+
|Type=GMAC-ADDR |                                    (1 byte)
+-+-+-+-+-+-+-+-+
|    Length     |                                    (1 byte)
+-+-+-+-+-+-+-+-+-+-+-+-+-+-+-+-+
| RESV |   Topology-ID          |                    (2 bytes)
+-+-+-+-+-+-+-+-+-+-+-+-+-+-+-+-+
| RESV |   VLAN ID              |                    (2 bytes)
+-+-+-+-+-+-+-+-+-+-+-+-+-+-+-+-+
| Num Group Recs |                                   (1 byte)
+-+-+-+-+-+-+-+-+-+-+-+-+-+-+-+-+-+-+-+-+-+-+-+-+-+-+-+-+-+-+
|                   GROUP RECORDS (1)                       |
+-+-+-+-+-+-+-+-+-+-+-+-+-+-+-+-+-+-+-+-+-+-+-+-+-+-+-+-+-+-+
|                   . . . . . . . . . . .                   |
+-+-+-+-+-+-+-+-+-+-+-+-+-+-+-+-+-+-+-+-+-+-+-+-+-+-+-+-+-+-+
|                   GROUP RECORDS (N)                       |
+-+-+-+-+-+-+-+-+-+-+-+-+-+-+-+-+-+-+-+-+-+-+-+-+-+-+-+-+-+-+
```

FIG. 3B

METHOD AND APPARATUS FOR SENDING TRANSPARENT INTERCONNECTION OF LOTS OF LINKS DATA FRAME

CROSS-REFERENCE TO RELATED APPLICATION

This application is a continuation of International Application No. PCT/CN2013/073988, filed on Apr. 10, 2013, which claims priority to Chinese Patent Application No. 201210468141.7, filed on Nov. 19, 2012, both of which are hereby incorporated by reference in their entireties.

TECHNICAL FIELD

The present invention relates to communications technologies, and in particular, to a method and an apparatus for sending a Transparent Interconnection of Lots of Links data frame.

BACKGROUND

A basic principle of a Transparent Interconnection of Lots of Links (TRILL) is, by applying an extended Intermediate System to Intermediate System (ISIS) link state protocol to a data link layer network, that is, a layer 2 network, a problem of low utilization of link bandwidth and a small networking scale in a Spanning Tree Protocol (STP) technology used in the layer 2 network is overcome.

A virtual private local area network service (VPLS) may enable that user networks that are geographically isolated can be connected through a wide area network, so that a connection effect among networks is just like being in a local area network. Therefore, multiple TRILL networks may be interconnected by means of the VPLS. A network formed by means of interconnection through the VPLS is called a TRILL over VPLS network in the following. TRILL over VPLS enlarges a TRILL network, which is beneficial to unified management and maintenance of the multiple TRILL networks.

In TRILL over VPLS, a packet is forwarded using a virtual switch instance (VSI), a correspondence exists between a user virtual local area network (VLAN) and the VSI, and a virtual switch instance identity (VSI ID) corresponding to the user VLAN may be acquired according to the correspondence between the user VLAN and the VSI. When a broadcast, unknown unicast or multicast (BUM) packet enters the VPLS, a VPLS provider edge (PE) sends the packet in a VSI to which the VSI ID belongs, and broadcasts, to all PEs through a PW port, the BUM packet accessing the VPLS. Because in a broadcast process, a local VPLS PE does not differentiate a remote PE that needs to receive the BUM packet, but copies the BUM packet and sends the BUM packet to all remote PEs at a local PE pseudo wire (PW) side; for a remote PE that does not need to receive the BUM packet, a waste of bandwidth between the local PE and the remote PE is caused.

SUMMARY

The present invention provides a method and an apparatus for sending a TRILL data frame, to solve a problem of a waste of bandwidth at a network side caused by broadcasting and copying a TRILL data frame to all PW sides when the TRILL data frame is forwarded.

A first aspect of the present invention provides a method for sending a TRILL data frame, including acquiring a user VLAN in a first protocol packet, or acquiring a combination of a user VLAN and a user multicast medium access control (MAC) address; acquiring a first port identifier of a PW port receiving the first protocol packet; storing, in a forwarding table, a correspondence between the acquired user VLAN and the first port identifier or a correspondence between the combination of the user VLAN and the user multicast MAC address and the first port identifier; and searching, when a TRILL data frame is received, according to a user VLAN or a combination of a user VLAN and a user multicast MAC address in the TRILL data frame, the forwarding table for a second port identifier corresponding to the VLAN or the combination of the user VLAN and the user multicast MAC address in the TRILL data frame, and forwarding the TRILL data frame from a PW port corresponding to the second port identifier.

In a first possible implementation manner of the first aspect, the first protocol packet is a TRILL control frame, and the acquiring a user VLAN or a combination of a user VLAN and a user multicast MAC address in a first protocol packet includes acquiring, from a PW side, the user VLAN or the combination of the user VLAN and the user multicast MAC address in the TRILL control frame; and the acquiring a first port identifier of a PW port receiving the first protocol packet includes acquiring a port identifier of a PW port receiving the TRILL control frame, and using the port identifier of the PW port receiving the TRILL control frame as the first port identifier.

With reference to the first possible implementation manner of the first aspect, in a second possible implementation manner, when the first protocol packet is the TRILL control frame, the acquiring, from a PW side, the user VLAN or the combination of the user VLAN and the user multicast MAC address in the TRILL control frame includes any one of the following manners: listening to a TRILL control frame including an interested VLAN and spanning tree roots subtype-length-value (Sub-TLV), and acquiring the user VLAN from the TRILL control frame including the interested VLAN and spanning tree roots Sub-TLV; listening to a TRILL control frame including a multicast address Sub-TLV, and acquiring the combination of the user VLAN and the user multicast MAC address from the TRILL control frame including the multicast address Sub-TLV; listening to a TRILL control frame including a fine grained label Sub-TLV, and acquiring a label pair from the TRILL control frame including the fine grained label Sub-TLV to serve as the user VLAN; and listening to a TRILL control frame including a fine grained label multicast address Sub-TLV, and acquiring a combination of a label pair and a user fine grained label multicast MAC address from the TRILL control frame including the fine grained label multicast address Sub-TLV.

In a third possible implementation manner of the first aspect, the acquiring a user VLAN or a combination of a user VLAN and a user multicast MAC address in a first protocol packet includes receiving, from a PW side, a Multiple VLAN Registration Protocol (MVRP) packet sent by a remote device, where the MVRP packet includes the user VLAN acquired by the remote device from the TRILL control frame obtained by listening, or, receiving, from a PW side, a Multiple MAC Registration Protocol (MMRP) packet sent by a remote device, where the MMRP packet includes the combination of the user VLAN and the user multicast MAC address acquired by the remote device from the TRILL control frame obtained by listening; and the acquiring a first port identifier of a PW port receiving the first protocol packet includes acquiring a port identifier of a PW port receiving the MVRP packet or the MMRP packet to serve as the first port identifier.

With reference to the first aspect and any one of the first, second, and third possible implementation manners of the first aspect, in a fourth possible implementation manner, the searching, when a TRILL data frame is received, according to a VLAN or a combination of a user VLAN and a user multicast MAC address in the TRILL data frame, the forwarding table for a second port identifier corresponding to the VLAN or the combination of the user VLAN and the user multicast MAC address in the TRILL data frame, and forwarding the TRILL data frame from a PW port corresponding to the second port identifier includes, in a case in which the received TRILL data frame is a broadcast data frame or an unknown unicast data frame, searching, according to the user VLAN in the TRILL data frame, the forwarding table for the second port identifier corresponding to the user VLAN in the TRILL data frame, and forwarding the TRILL data frame from the PW port corresponding to the second port identifier; and in a case in which the received TRILL data frame is a multicast data frame, searching, according to the combination of the user VLAN and the user multicast MAC address in the TRILL data frame, the forwarding table for the second port identifier corresponding to the combination of the user VLAN and the user multicast MAC address in the TRILL data frame, and forwarding the TRILL data frame from the PW port corresponding to the second port identifier.

A second aspect of the present invention provides an apparatus for sending a TRILL data frame, including a first acquiring module configured to acquire a user VLAN in a first protocol packet, or acquire a combination of a user VLAN and a user multicast MAC address; a second acquiring module configured to acquire a first port identifier of a PW port receiving the first protocol packet; a storage module configured to store, in a forwarding table, a correspondence between the acquired user VLAN and the first port identifier or a correspondence between the combination of the user VLAN and the user multicast MAC address and the first port identifier; and a sending module configured to, when a TRILL data frame is received, search, according to a user VLAN or a combination of a user VLAN and a user multicast MAC address in the TRILL data frame, the forwarding table for a second port identifier corresponding to the VLAN or the combination of the user VLAN and the user multicast MAC address in the TRILL data frame, and forward the TRILL data frame from a PW port corresponding to the second port identifier.

In a first possible implementation manner of the second aspect, the first acquiring module includes a first acquiring unit configured to acquire, from a PW side, the user VLAN or the combination of the user VLAN and the user multicast MAC address in a TRILL control frame; and the second acquiring module includes a second acquiring unit configured to acquire a port identifier of a PW port receiving the TRILL control frame, and use the port identifier of the PW port receiving the TRILL control frame as the first port identifier.

With reference to the first possible implementation manner of the second aspect, in a second possible implementation manner, the first acquiring unit is configured to listen to a TRILL control frame including an interested VLAN and spanning tree roots Sub-TLV, and acquire the user VLAN from the TRILL control frame including the interested VLAN and spanning tree roots Sub-TLV; listen to a TRILL control frame including a multicast address Sub-TLV, and acquire the combination of the user VLAN and the user multicast MAC address from the TRILL control frame including the multicast address Sub-TLV; listen to a TRILL control frame including a fine grained label Sub-TLV, and acquire a label pair from the TRILL control frame including the fine grained label Sub-TLV, to serve as the user VLAN; and listen to a TRILL control frame including a fine grained label multicast address Sub-TLV, and acquire a combination of a label pair and a user fine grained label multicast MAC address from the TRILL control frame including the fine grained label multicast address Sub-TLV.

In a third possible implementation manner of the second aspect, the first acquiring module further includes a third acquiring unit configured to receive, from a PW side, a MVRP packet sent by a remote device, where the MVRP packet includes the user VLAN acquired by the remote device from the TRILL control frame obtained by listening, or, receive, from a PW side, a MMRP packet sent by a remote device, where the MMRP packet includes the combination of the user VLAN and the user multicast MAC address acquired by the remote device from the TRILL control frame obtained by listening; and the second acquiring module includes a fourth acquiring unit configured to acquire a port identifier of a PW port receiving the MVRP packet or the MMRP packet to serve as the first port identifier.

With reference to the first, second, and third possible implementation manners of the second aspect, in a fourth possible implementation manner, the sending module includes a first sending unit configured to, in a case in which the received TRILL data frame is a broadcast data frame or an unknown unicast data frame, search, according to the user VLAN in the TRILL data frame, the forwarding table for the second port identifier corresponding to the user VLAN in the TRILL data frame, and forward the TRILL data frame from the PW port corresponding to the second port identifier; and a second sending unit configured to, in a case in which the received TRILL data frame is a multicast data frame, search, according to the combination of the user VLAN and the user multicast MAC address in the TRILL data frame, the forwarding table for the second port identifier corresponding to the combination of the user VLAN and the user multicast MAC address in the TRILL data frame, and forward the TRILL data frame from the PW port corresponding to the second port identifier.

According to the method and apparatus for sending a TRILL data frame provided in the present invention, a PE acquires a user VLAN or a combination of a user VLAN and a user multicast MAC address in a TRILL control frame, and a first port identifier of a PW port receiving the TRILL control frame, and stores, in a forwarding table, a correspondence between the acquired user VLAN and a port identifier, or a correspondence between the combination of the user VLAN and the user multicast MAC address and a port identifier, so as to search, when a TRILL data frame is received, according to a user VLAN or the combination of a user VLAN and a user multicast MAC address in the TRILL data frame, the forwarding table to find a corresponding second port identifier, so that the TRILL data frame is forwarded only from a PW port corresponding to the second port identifier after being copied, thereby avoiding a waste of bandwidth at a VPLS network side caused by broadcasting and copying, by the PE, TRILL data frames from all remote devices at a PW side connected to the PE.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show some embodiments of the present invention, and persons of ordinary skill in the art may still derive other drawings from these accompanying drawings without creative efforts.

FIG. 3A is a schematic diagram of formats of an Interested VLAN and Spanning Tree Roots Sub-TLV that are applicable to an embodiment of the present invention;

FIG. 3B is a schematic diagram of a format of a Group MAC Address Sub-TLV that is applicable to an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1A:
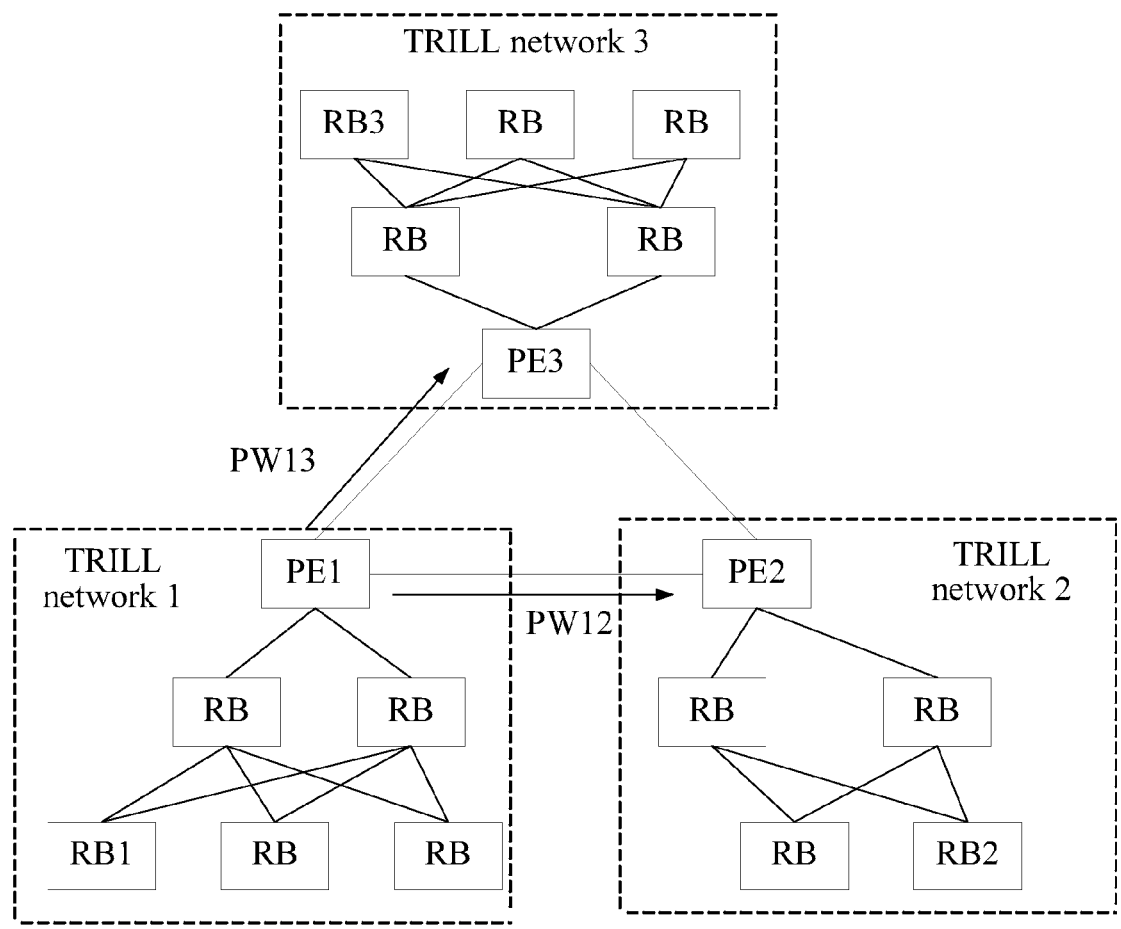
FIG. 1A is a schematic diagram of a network architecture to which a method for sending a TRILL data frame is applicable according to an embodiment of the present invention.
Figure 1B:
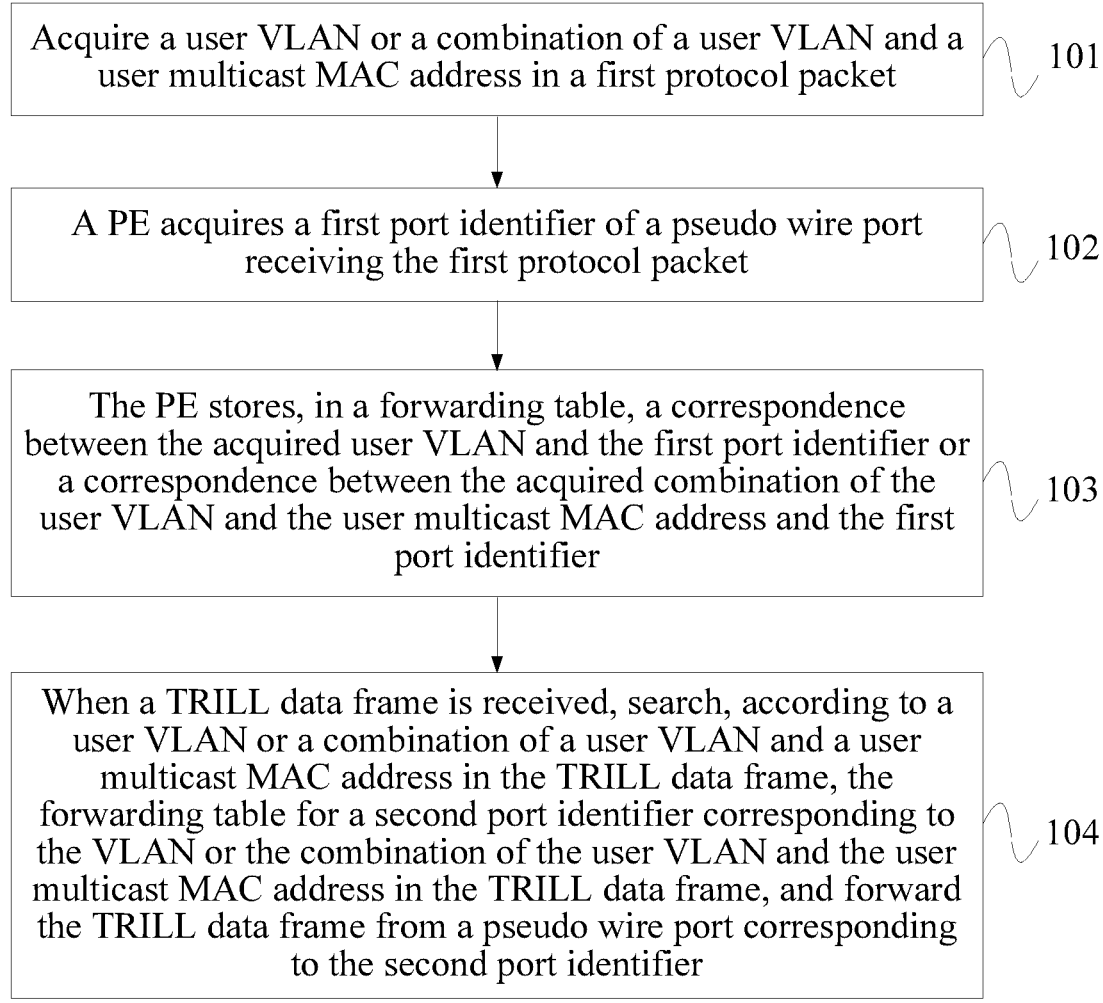
FIG. 1B is a flowchart of a first embodiment of a method for sending a TRILL data frame according to the present invention.

FIG. 1A is a schematic diagram of a network architecture to which a method for sending a TRILL data frame is applicable according to an embodiment of the present invention, and FIG. 1B is a flowchart of a first embodiment of a method for sending a TRILL data frame according to the present invention. The method of this embodiment may be executed by any PE in a network.

A network bridge running a TRILL protocol is called a routing bridge (RB), and is a network bridge device having a routing forwarding characteristic. Referring to FIG. 1A, a PE1, a PE2, and a PE3 separately constitute a TRILL network with multiple RBs, and multiple TRILL networks are interconnected by means of VPLSs to constitute a TRILL over VPLS network; the PEs are connected using PW ports, and the PEs and the RBs are connected using attachment circuit (AC) ports. In this embodiment, the present invention is described in detail by interconnecting a TRILL network 1, a TRILL network 2, and a TRILL network 3 by means of the VPLS into the TRILL over VPLS network. In the TRILL over VPLS network, the PE listens to a first protocol packet, where the first protocol packet is, for example, a TRILL control frame, a MVRP packet, or a multiple MAC registration protocol packet; and stores, in a forwarding table, a correspondence between a user VLAN in the first protocol packet and an identifier of a PW port receiving the first protocol packet or a correspondence between a combination of a user VLAN and a user multicast MAC address in the first port and an identifier of a PW port receiving the first protocol packet. At a PW side, a TRILL data frame is forwarded as required. For example, in a case in which the first protocol packet is the TRILL control frame, the PE1 listens to the TRILL control frame, so as to acquire the user VLAN or the combination of the user VLAN and the user multicast MAC address in the TRILL control frame. In addition, the PE1 acquires a PW port receiving the TRILL control frame, such as a PW12 port, and stores, in the forwarding table, a correspondence between the acquired user VLAN and the identifier of the PW port or a correspondence between the combination of the user VLAN and the user multicast MAC address and the identifier of the PW port. After receiving the TRILL data frame, the PE1 finds, in the forwarding table according to the user VLAN or the combination of the user VLAN and the user multicast MAC address in the TRILL data frame, a PW port PW12 corresponding to the user VLAN or the combination of the user VLAN and the user multicast MAC address in the TRILL data frame, and sends the TRILL data frame through the PW12 port instead of forwarding the TRILL data frame through the PW13 port, thereby avoiding a waste of bandwidth between the PE1 and the PE3. For a specific process, refer to FIG. 1B.

As shown in FIG. 1B, the method in this embodiment may include the following steps.

Step 101: A PE acquires a user VLAN or a combination of a user VLAN and a user multicast MAC address in a first protocol packet.

In this step, the PE acquires the user VLAN or the combination of the user VLAN and the user multicast MAC address in the first protocol packet. In a case in which the first protocol packet is a TRILL control frame, the PE acquires the user VLAN in the TRILL control frame, or acquires the combination of the user VLAN and the user multicast MAC address in the TRILL control frame. In a case in which the first protocol packet is a MVRP packet, the PE acquires the user VLAN in the MVRP packet. In a case in which the first protocol packet is a MMRP packet, the PE acquires the combination of the user VLAN and the user multicast MAC address in the MVRP packet.

Step 102: The PE acquires a first port identifier of a PW port receiving the first protocol packet.

The PE acquires a port identifier of the PW port receiving the first protocol packet, and for the convenience of description, the port identifier is called the first port identifier in the following.

Step 103: The PE stores, in a forwarding table, a correspondence between the acquired user VLAN and the first port identifier or a correspondence between the acquired combination of the user VLAN and the user multicast MAC address and the first port identifier.

The first port identifier of the PW port receiving the first protocol packet corresponds to the user VLAN or the combination of the user VLAN and the user multicast MAC address acquired from the first protocol packet. The PE stores, in the forwarding table, the correspondence between the acquired user VLAN and the first port identifier of the PW port or the correspondence between the combination of the user VLAN and the user multicast MAC address and the first port identifier of the PW port, so that the correspondence between the user VLAN and the PW port receiving the TRILL control frame or the correspondence between the combination of the user VLAN and the user multicast MAC address and the PW port receiving the TRILL control frame, or the like is stored in the forwarding table.

Step 104: When a TRILL data frame is received, search, according to a user VLAN or a combination of a user VLAN and a user multicast MAC address in the TRILL data frame, the forwarding table for a second port identifier corresponding to the VLAN or the combination of the user VLAN and the user multicast MAC address in the TRILL data frame, and forward the TRILL data frame from a PW port corresponding to the second port identifier.

When the TRILL data frame is received, the PE searches the forwarding table according to the user VLAN or the combination of the user VLAN and the user multicast MAC address in the TRILL data frame, to acquire a PW port corresponding to the user VLAN or the combination of the user VLAN and the user multicast MAC address in the TRILL data frame, so as to send the TRILL data frame.

According to the method for sending a TRILL data frame provided in this embodiment, a PE acquires a user VLAN or a combination of a user VLAN and a user multicast MAC address in a first protocol packet, and a first port identifier of a PW port receiving the first protocol packet, and stores, in a forwarding table, a correspondence between the acquired user VLAN and the first port identifier, or stores, in the forwarding table, a correspondence between the combination of the user VLAN and the user multicast MAC address and the first port identifier, so that when a TRILL data frame is received, the PE searches the forwarding table according to a user VLAN or a user VLAN and a user multicast MAC in the TRILL data frame to find a corresponding second port identifier, so as to forward the TRILL data frame only from a PW port corresponding to the second port identifier after being copied, so that the TRILL data frame is copied and forwarded from a corresponding PW port as required, thereby avoiding a waste of bandwidth at a VPLS network side caused by broadcasting and copying, by the PE, TRILL data frames from all remote devices at a PW side connected to the PE.

In an embodiment of the present invention, the PE receives the first protocol packet, which is, for example, the TRILL control frame. According to different functions of packets, TRILL packets are classified into TRILL data frames and TRILL control frames. When the first protocol packet received by the PE is the TRILL control frame, the PE acquires the user VLAN or the combination of the user VLAN and the user multicast MAC address in the TRILL control frame, and the port identifier of the PW port receiving the TRILL control frame. Referring to FIG. 1A, according to a preset policy, user VLANs10 are configured for an edge router RB1 in a TRILL network 1 and an RB2 in a TRILL network 2, and a user VLAN20 is configured for an RB3 in a TRILL network 3, and then a PE1 acquires a VLAN10 in the TRILL control frame; or, a user VLAN10 is configured for an edge router RB1 in a TRILL network 1, where a user in the user VLAN10 requests the multicast MAC address, such as a MAC1, the user VLAN10 is configured for an edge router RB2 in a TRILL network 2, where the user in the user VLAN10 requests the multicast MAC address, such as the MAC1, and the user VLAN10 is configured for an edge router RB3 in a TRILL network 3, where a user in the user VLAN10 requests the multicast MAC address, such as a MAC2, and then, the PE1 acquires a combination of the user VLAN10 and the user multicast MAC address MAC1 in the TRILL control frame.

The PE stores, in the forwarding table, a correspondence between the acquired user VLAN and the first port identifier or a correspondence between the combination of the user VLAN and the user multicast MAC address and the first port identifier of the PW port, so that a correspondence between the user VLAN and the PW port receiving the TRILL control frame or a correspondence between the combination of the user VLAN and the user multicast MAC address and the PW port receiving the TRILL control frame is stored in the forwarding table.

When the TRILL data frame is received, the PE searches the forwarding table according to the user VLAN or the combination of the user VLAN and the user multicast MAC in the TRILL data frame, to acquire the PW port corresponding to the user VLAN or the combination of the user VLAN and the user multicast MAC address in the TRILL data frame, so as to send the TRILL data frame.

According to the method for sending a TRILL data frame provided in this embodiment, a PE acquires a user VLAN or a combination of a user VLAN and a user multicast MAC address in a TRILL control frame, and a first port identifier of a PW port receiving the TRILL control frame, and stores, in a forwarding table, a correspondence between the acquired user VLAN and the first port identifier, or a correspondence between the combination of the user VLAN and user multicast MAC address and the first port identifier, so that when a TRILL data frame is received, the PE searches the forwarding table according to a user VLAN or a combination of a user VLAN and a user multicast MAC address in the TRILL data frame, to find a corresponding second port identifier, so as to forward the TRILL data frame only from a PW port corresponding to the second port identifier after being copied, so that the TRILL data frame is copied and forwarded from the corresponding PW port as required, thereby avoiding a waste of bandwidth at a VPLS network side caused by broadcasting and copying, by the PE, TRILL data frames from all remote devices at a PW side connected to the PE. For a specific process, refer to FIG. 2, or refer to FIG. 4 and FIG. 5.

Figure 2:
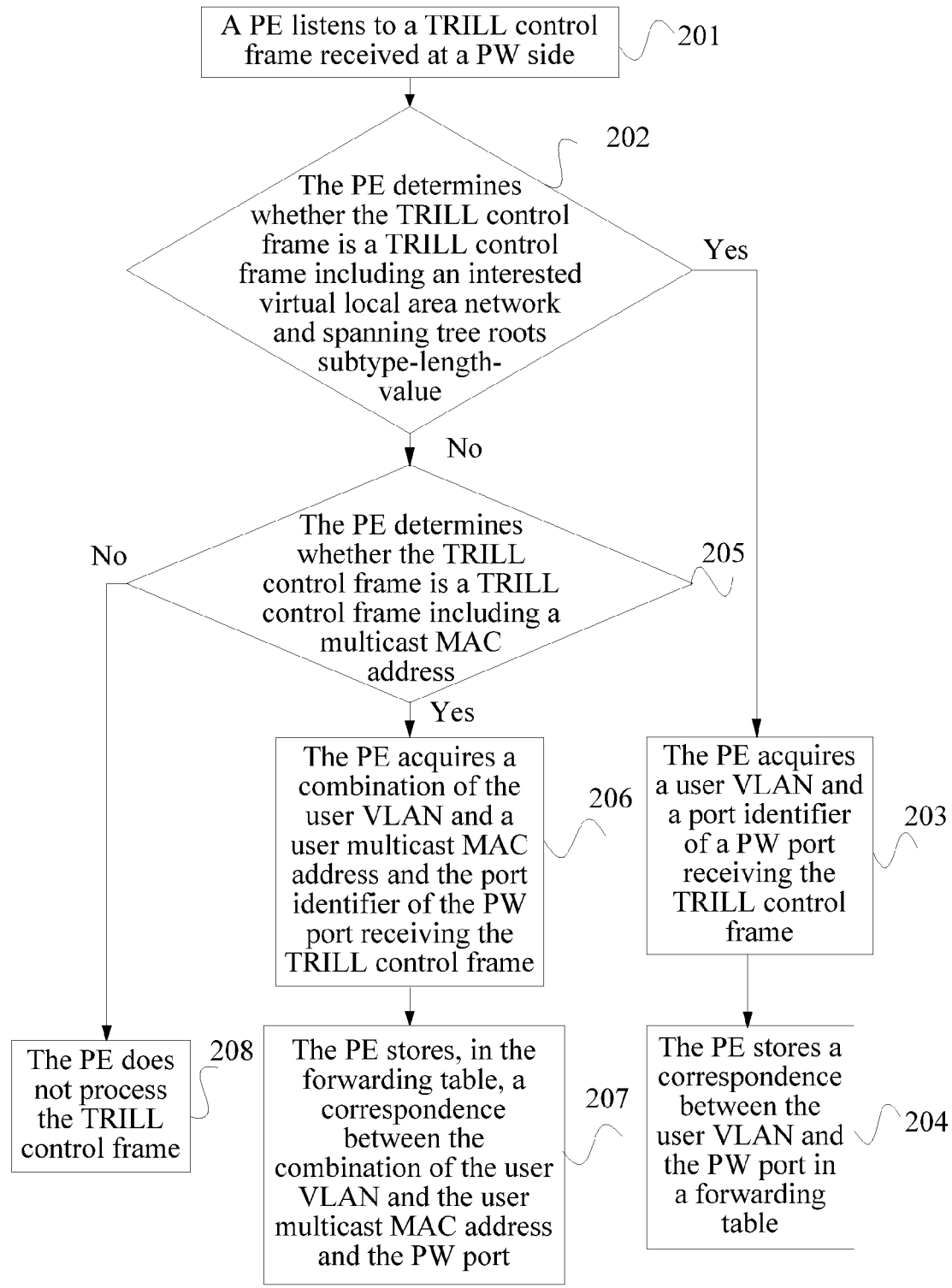
FIG. 2 is a flowchart of a second embodiment of a method for sending a TRILL data frame according to the present invention.

FIG. 2 is a flowchart of a second embodiment of a method for sending a TRILL data frame according to the present invention. In this embodiment, by listening to a TRILL control frame, a PE acquires a user VLAN or a combination of a user VLAN and a user multicast MAC address, and a first port identifier of a PW port receiving the TRILL control frame. This embodiment includes the following steps.

Step 201: The PE listens to a TRILL control frame received at a PW side.

On a PE node of a VPLS, listening is performed on the TRILL control frame, types of different TRILL control frame type-length-values (TLV) are different, the user VLAN or the combination of the user VLAN and the user multicast MAC address in the TRILL control frame, and a PW port for the PE node to acquire and receive the TRILL control frame are acquired according to different types of the TLVs.

Step 202: The PE determines whether the TRILL control frame is a TRILL control frame including an interested VLAN and spanning tree roots Sub-TLV, and if the TRILL control frame is the TRILL control frame including the interested VLAN and spanning tree roots Sub-TLV, executes step 203 to step 204; otherwise, executes step 205 to step 208.

The PE determines, according to a type field in a TLV included in the received TRILL control frame, whether the acquired TRILL control frame is the TRILL control frame including the Interested VLAN and Spanning Tree Roots Sub-TLV, and formats of the Interested VLAN and Spanning Tree Roots Sub-TLV are shown in FIG. 3A. FIG. 3A is a schematic diagram of formats of an Interested VLAN and Spanning Tree Roots Sub-TLV that are applicable to an embodiment of the present invention, and a user VLAN is an Interested VLAN shown in FIG. 3A.

Step 203: The PE acquires the user VLAN and a port identifier of a PW port receiving the TRILL control frame.

After determining that the received TRILL control frame is the TRILL control frame including the Interested VLAN and Spanning Tree Roots Sub-TLV, the PE device acquires an Interested VLAN in the TRILL control frame to serve as the user VLAN, and acquires the port identifier of the PW port receiving the TRILL control frame.

Step 204: The PE stores a correspondence between the user VLAN and the PW port in the forwarding table.

In this step, the PE stores, in the forwarding table, the correspondence between the user VLAN and the PW port that are acquired in the foregoing step, so that after receiving a broadcast data frame or an unknown unicast data frame, the PE obtains a corresponding PW port from the forwarding table according to a user VLAN in the broadcast data frame or the unknown unicast data frame, so as to copy and forward the broadcast data frame or the unknown unicast data frame.

Step 205: The PE determines whether the TRILL control frame is a TRILL control frame including a multicast MAC address, and if the TRILL control frame is the TRILL control frame including the multicast MAC address, executes step 206 to step 207; otherwise, executes step 208.

The PE determines, according to the type field in the TLV included in the received TRILL control frame, whether the acquired TRILL control frame is a TRILL control frame including a Group MAC Address Sub-TLV. A format of the Group MAC Address Sub-TLV is shown in FIG. 3B. FIG. 3B is a schematic diagram of a format of a Group MAC Address Sub-TLV that is applicable to the embodiment of the present invention; and the combination of the user VLAN and the user multicast MAC address is the combination of a VLAN ID and Group records in FIG. 3B.

Step 206: The PE acquires the combination of the user VLAN and the user multicast MAC address and the port identifier of the PW port receiving the TRILL control frame.

After determining that the acquired TRILL control frame is the TRILL control frame including the Group MAC Address Sub-TLV, the PE acquires the combination of the user VLAN and the user multicast MAC address in the TRILL control frame, and acquires the port identifier of the PW port receiving the TRILL control frame.

Step 207: The PE stores, in the forwarding table, a correspondence between the combination of the user VLAN and the user multicast MAC address and the PW port.

In this step, the PE stores, in the forwarding table, the correspondence between the combination of the user VLAN and the user multicast MAC address and the PW port that are acquired in the foregoing step, so that after receiving a multicast TRILL data frame, the PE obtains a corresponding PW port from the forwarding table, so as to copy and forward the multicast TRILL data frame.

Step 208: The PE does not process the TRILL control frame.

In this embodiment, the present invention is described in detail using a first protocol packet as the TRILL control frame that is a TRILL control frame including an Interested VLAN and Spanning Tree Roots Sub-TLV or a TRILL control frame including the Group MAC Address Sub-TLV. However, the present invention is not limited thereto, and in another implementation manner, different manners may be used, for example, the TRILL control frame is a TRILL control frame including a Fine Grained Label Sub-TLV, or the TRILL control frame is a TRILL control frame including a Fine Grained Label Group MAC Address Sub-TLV.

In this embodiment, the present invention is described in detail using an example in which step 202 to step 204 are first executed and then step 205 to step 207 are executed; however, the present invention is not limited thereto, and in another implementation manner, step 205 to step 207 may also be first executed, and then step 202 to step 204 are executed.

According to the method for sending a TRILL data frame provided in the present invention, a PE may acquire, at a PW side, a user VLAN, or a user VLAN and a user multicast MAC in a TRILL control frame, and a port identifier of a PW port receiving the TRILL control frame, and store a correspondence there-between in a forwarding table, so that when a TRILL data frame is received, the forwarding table is searched according to a user VLAN or a user VLAN and a user multicast MAC in the TRILL data frame to find a corresponding PW port, so as to forward the TRILL data frame only from the corresponding PW port after the TRILL data frame is copied, thereby avoiding a waste of bandwidth at a VPLS network side caused by broadcasting and copying, by the PE, TRILL data frames from all remote devices at a PW side connected to the PE.

Figure 4:
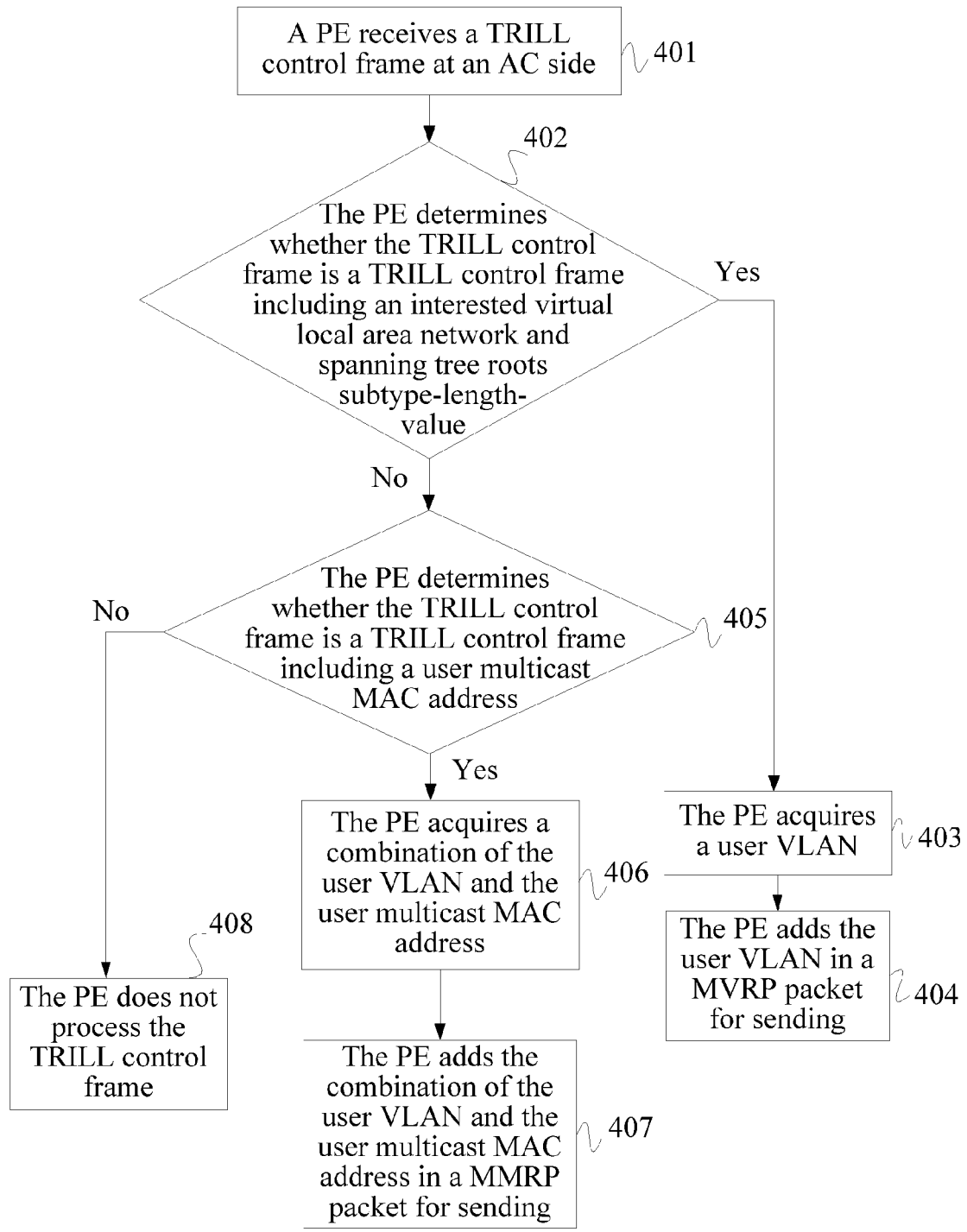
FIG. 4 is a flowchart of a third embodiment of a method for sending a TRILL data frame according to the present invention.

FIG. 4 is a flowchart of a third embodiment of a method for sending a TRILL data frame according to the present invention. In this embodiment, a PE receives a MVRP packet or a MMRP packet sent by a remote device, and acquires a user VLAN or a combination of a user VLAN and a user multicast MAC address in a protocol packet, and a first port identifier of a PW port receiving a TRILL control frame. This embodiment includes the following process.

Step 401: The PE receives the TRILL control frame at an AC side.

Step 402: The PE determines whether the TRILL control frame is a TRILL control frame including an interested VLAN and spanning tree roots Sub-TLV; if yes, executes step 403 to step 404; otherwise, executes step 405.

The PE determines, according to a type field in a TLV included in the received TRILL control frame, whether the received TRILL control frame is the TRILL control frame including the Interested VLAN and Spanning Tree Roots Sub-TLV, and for formats of the Interested VLAN and Spanning Tree Roots Sub-TLV, reference may be made to FIG. 3A, where a user VLAN is an Interested VLAN in FIG. 3A.

Step 403: The PE acquires the user VLAN.

After determining that the received TRILL control frame is the TRILL control frame including the Interested VLAN and the Spanning Tree Roots Sub-TLV, the PE acquires the user VLAN in the TRILL control frame.

Step 404: The PE adds the user VLAN in the MVRP packet for sending.

The PE adds the user VLAN in the MVRP packet and broadcasts the MVRP packet to all remote PEs at a PW side connected to the PE, so that a correspondence between a PW port and the user VLAN is transferred to the remote PEs, so that the remote PEs acquire the user VLAN in the MVRP packet and a port identifier of a PW port receiving the MVRP packet, and store a correspondence between the user VLAN and the port identifier in a forwarding table.

Step 405: The PE determines whether the TRILL control frame is a TRILL control frame including a user multicast MAC address, and if yes, executes step 406 to step 407; otherwise, executes step 408.

The PE determines, according to the type field in the TLV included in the received TRILL control frame, whether the acquired TRILL control frame is a TRILL control frame including a Group MAC Address Sub-TLV, and for a format of the Group MAC Address Sub-TLV, reference may be made to FIG. 3B.

Step 406: The PE acquires the combination of the user VLAN and the user multicast MAC address.

After determining that the received TRILL control frame is the TRILL control frame including the Group MAC Address Sub-TLV, the PE acquires the combination of the user VLAN and the user multicast MAC address in the TRILL control frame, and acquires an AC port receiving the TRILL control frame.

Step 407: The PE adds the combination of the user VLAN and the user multicast MAC address in the MMRP packet for sending.

The PE adds the user VLAN and the user multicast MAC in the MMRP packet and broadcasts the MMRP packet to all remote PEs at the PW side connected to the PE, so as to transfer a correspondence between the PW port and the combination of the user VLAN and the user multicast MAC address to the remote PEs, so that the remote PEs acquire the correspondence between the combination of the user VLAN and the user multicast MAC address in the protocol packet and the port identifier of the PW port receiving the protocol packet and store the correspondence in the forwarding table.

Step 408: The PE does not process the TRILL control frame.

When the received TRILL control frame does not belong to the TRILL control frames in the two formats, the PE does not perform processing.

In this embodiment, the present invention is described in detail using the first protocol packet as the MVRP packet or the MMRP packet which is a MVRP packet including the Interested VLAN and Spanning Tree Roots Sub-TLV or a MMRP packet including the Group MAC Address Sub-TLV; however, the present invention is not limited thereto, and in another implementation manner, different manners may be used, for example, the MVRP packet may be a MVRP packet including a fine grained label Sub-TLV, and the MMRP packet may be a MMRP packet including a fine grained label multicast address Sub-TLV.

Because of symmetry of sending and receiving, a remote PE may be used as a local PE, and processes, by the remote PE and the local PE, of receiving the MVRP packet or the MMRP packet, and acquiring the user VLAN or the combination of the user VLAN and the user multicast MAC address in the protocol packet, and the first port identifier of the PW port receiving the TRILL control frame are similar, which are not described herein again.

In this embodiment, the present invention is described in detail using an example in which step 402 to step 404 are first executed and then step 405 to step 407 are executed; however, the present invention is not limited thereto, and in another implementation manner, step 405 to step 407 may also be first executed, and then step 402 to step 404 are executed.

According to the method for sending a TRILL data frame provided in this embodiment, a PE may acquire, at an AC side, a user VLAN or a combination of a user VLAN and a user multicast MAC address in a TRILL control frame, and add the user VLAN or the combination of the user VLAN and the user multicast MAC address in an MVRP packet or an MMRP packet and send the MVRP packet or the MMRP packet to a remote PE, so that a remote device can store, in the forwarding table, a correspondence between the user VLAN in the received MVRP packet or MMRP packet and a PW port receiving the MVRP packet or the MMRP packet, or a correspondence between the combination of the user VLAN and the user multicast MAC address in the received MVRP packet or MMRP packet and a PW port receiving the MVRP packet or MMRP packet.

Figure 5:
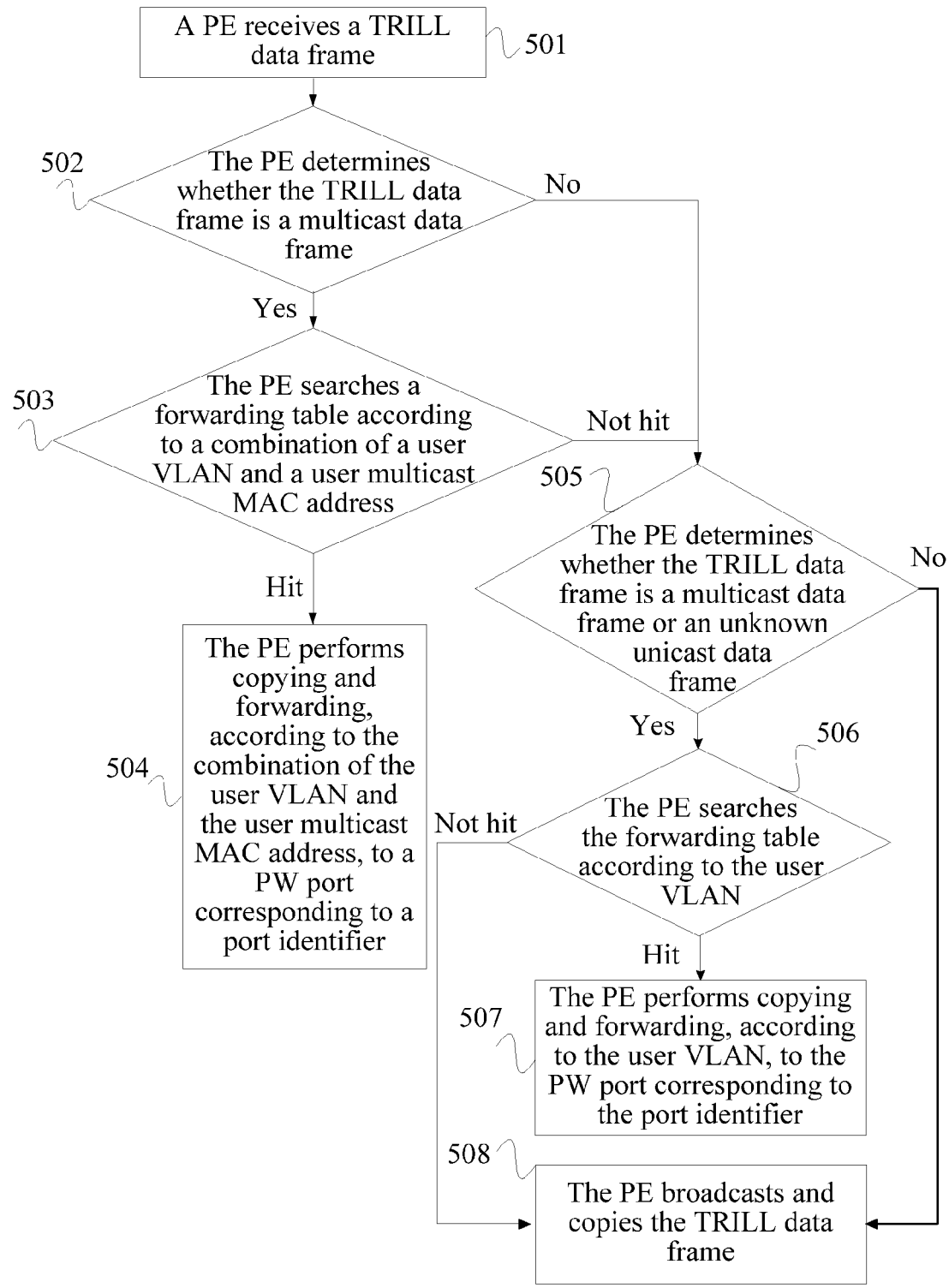
FIG. 5 is a flowchart of a fourth embodiment of a method for sending a TRILL data frame according to the present invention.

FIG. 5 is a flowchart of a fourth embodiment of a method for sending a TRILL data frame according to the present invention. This embodiment is based on the foregoing embodiments, and an operation of forwarding a TRILL data frame after a PE receives the TRILL data frame is described in detail. This embodiment includes the following steps:

Step 501: The PE receives the TRILL data frame.

The PE receives the TRILL data frame from an AC side, for example, receives a broadcast data frame, an unknown unicast data frame, or a multicast data frame that enters a VPLS.

Step 502: The PE determines whether the TRILL data frame is a multicast data frame, and if the TRILL data frame is the multicast data frame, executes step 503 to step 504; otherwise, executes step 505.

The PE determines, according to a destination MAC address of the received TRILL data frame, whether the TRILL data frame is the multicast data frame.

Step 503: The PE searches the forwarding table according to a combination of a user VLAN and a user multicast MAC address, and if an entry with the combination of the user VLAN and the user multicast MAC address is obtained, executes step 504; otherwise, executes step 505.

In this step, if the TRILL data frame received by the PE is the multicast data frame, the forwarding table is searched, according to the combination of the user VLAN and the user multicast MAC address, for a port identifier corresponding to the combination of the user VLAN and the user multicast MAC address, so as to find a PW port corresponding to the port identifier.

Step 504: The PE performs copying and forwarding, according to the combination of the user VLAN and the user multicast MAC address, to the PW port corresponding to the port identifier.

The PE copies and forwards the multicast data frame according to the found PW port.

Step 505: The PE determines whether the TRILL data frame is a broadcast or an unknown unicast data frame, and if yes, executes step 506; otherwise, executes step 508.

When determining that the received TRILL data frame is not the multicast data frame, the PE further determines whether the received TRILL data frame is the broadcast data frame or the unknown unicast data frame. For example, when destination MAC addresses of the received TRILL data frame are all 1, it is considered that the received TRILL data frame is the broadcast data frame. If the received TRILL data frame does not belong to the multicast data frame, the broadcast data frame, or the unknown unicast data frame, step 508 is executed.

Step 506: The PE searches the forwarding table according to the user VLAN, and if an entry with the user VLAN is obtained, executes step 507; otherwise, executes step 508.

In this step, if the TRILL data frame received by the PE is the broadcast data frame or the unknown unicast data frame, a forwarding table is searched, according to the user VLAN, for a port identifier corresponding to the user VLAN, so that the PW port corresponding to the port identifier is found.

Step 507: The PE performs copying and forwarding, according to the user VLAN, to the PW port corresponding to the port identifier.

The PE copies and forwards the broadcast or the unknown unicast data frame according to the found PW port.

Step 508: The PE broadcasts and copies the TRILL data frame.

If the TRILL data frame received by the PE does not belong to the multicast data frame, the broadcast data frame, or the unknown unicast data frame, or one entry of the forwarding table cannot be obtained, the received TRILL data frame is copied and broadcasted.

According to the method for sending a TRILL data frame provided in this embodiment, by listening to a TRILL control frame in a VPLS PE, a multicast TRILL data frame and a broadcast/unknown unicast TRILL data frame encapsulated using TRILL are forwarded as required at a PW side, thereby avoiding a problem of broadcasting and copying a TRILL data frame to all PW sides when a VPLS network forwards the TRILL data frame, and saving bandwidth at a VPLS network side.

To describe the methods of the present invention more clearly, for acquiring a user VLAN in a TRILL control frame by a PE, the foregoing embodiments of the present invention are described in detail using a specific application scenario in the following.

Referring to FIG. 1A again, assuming that, according to a preset policy, user VLANs10 are configured for an edge router RB1 in a TRILL network 1 and an RB2 in a TRILL network 2, and a user VLAN20 is configured for an RB3 in a TRILL network 3, a PE1 acquires the user VLAN10 in a TRILL control frame that is from a PE2 and a port identifier PW12 of a PW port receiving the TRILL control frame, and stores a correspondence between the VLAN10 and the PW12; similarly, the PE1 acquires the user VLAN20 in a TRILL control frame that is from a PE3 and a port identifier PW13 of the PW port receiving the TRILL control frame, and stores a correspondence between the VLAN20 and the PW13.

When receiving a broadcast data frame or an unknown unicast data frame from the RB1, the PE1 searches the forwarding table according to the user VLAN10 in the broadcast data frame or the unknown unicast data frame, to find the port PW12 corresponding to the VLAN10, so as to forward the broadcast data frame or the unknown unicast data frame from the PW12 instead of the PW13, thereby avoiding a waste of link bandwidth between the PE1 and the PE3.

Figure 6:
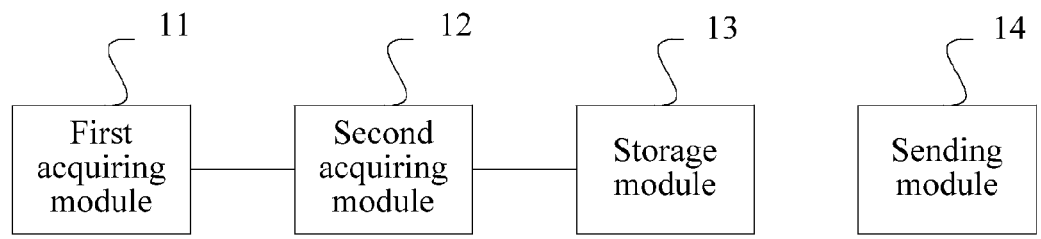
FIG. 6 is a schematic structural diagram of a first embodiment of an apparatus for sending a TRILL data frame according to the present invention.

FIG. 6 is a schematic structural diagram of a first embodiment of an apparatus for sending a TRILL data frame according to the present invention. As shown in FIG. 6, the apparatus in this embodiment may include a first acquiring module 11, a second acquiring module 12, a storage module 13, and a sending module 14.

The first acquiring module 11 is configured to acquire a user VLAN in a first protocol packet, or acquire a combination of a user VLAN and a user multicast MAC address.

The second acquiring module 12 is configured to acquire a first port identifier of a PW port receiving the first protocol packet.

The storage module 13 is configured to store, in a forwarding table, a correspondence between the acquired user VLAN and the first port identifier or a correspondence between the combination of the user VLAN and the user multicast MAC address and the first port identifier.

The sending module 14 is configured to, when a TRILL data frame is received, search, according to a user VLAN or a combination of a user VLAN and a user multicast MAC address in the TRILL data frame, the forwarding table for a second port identifier corresponding to the VLAN or the combination of the user VLAN and the user multicast MAC address in the TRILL data frame, and forward the TRILL data frame from a PW port corresponding to the second port identifier.

The apparatus in this embodiment may be configured to execute a technical solution of the method embodiment shown in FIG. 1B, and an implementation principle and a technical effect thereof are similar, which are not described herein again.

Figure 7:
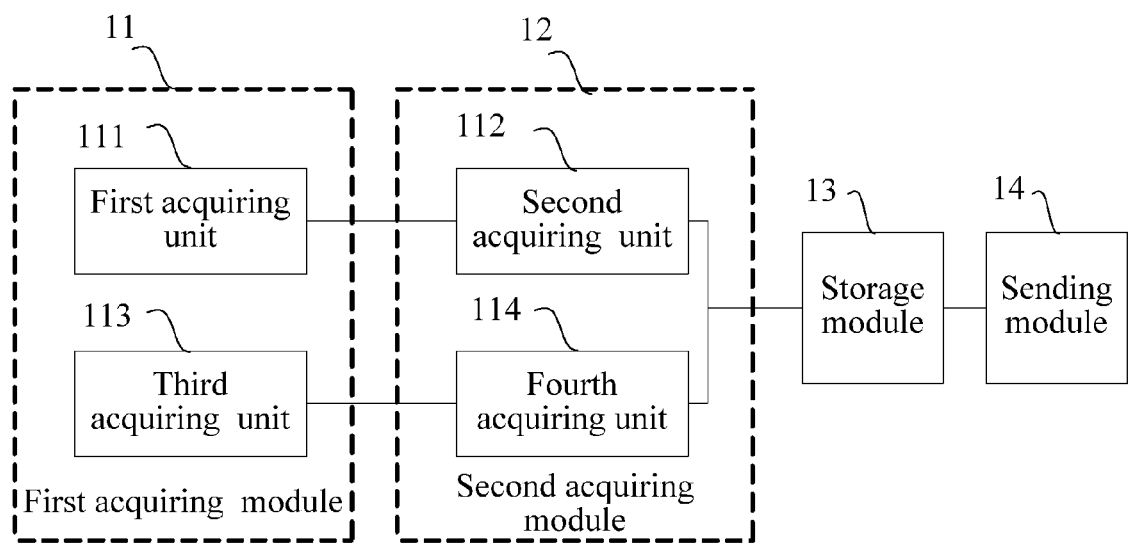
FIG. 7 is a schematic structural diagram of a second embodiment of an apparatus for sending a TRILL data frame according to the present invention.

FIG. 7 is a schematic structural diagram of a second embodiment of an apparatus for sending a TRILL data frame according to the present invention. As shown in FIG. 7, according to the apparatus in this embodiment based on a structure of the apparatus shown in FIG. 6, the first acquiring module 11 may further include a first acquiring unit 111; and the second acquiring module 12 may further include a second acquiring unit 112.

The first acquiring unit 111 is configured to acquire, from a PW side, the user VLAN or the combination of the user VLAN and the user multicast MAC address in a TRILL control frame.

The second acquiring unit 112 is configured to acquire a port identifier of a PW port receiving the TRILL control frame, and use the port identifier of the PW port receiving the TRILL control frame as the first port identifier.

Further, the first acquiring unit 111 is configured to listen to a TRILL control frame including an interested VLAN and spanning tree roots Sub-TLV, and acquire the user VLAN from the TRILL control frame including the interested VLAN and spanning tree roots Sub-TLV; listen to a TRILL control frame including a multicast address Sub-TLV, and acquire the combination of the user VLAN and the user multicast MAC address from the TRILL control frame including the multicast address Sub-TLV; listen to a TRILL control frame including a fine grained label, and acquire a label pair from the TRILL control frame including the fine grained label to serve as the user VLAN; and listen to a TRILL control frame including a multicast fine grained label, and acquire a user fine grained label and a fine grained label multicast MAC address from the TRILL data frame including the multicast fine grained label to serve as the user VLAN and the user multicast MAC address.

Referring to FIG. 7 again, further, the first acquiring module 11 of the apparatus for sending a TRILL data frame in the present invention further includes a third acquiring unit 113 configured to receive, from a PW side, a MVRP packet sent by a remote device, where the MVRP packet includes the user VLAN acquired by the remote device from the TRILL control frame obtained by listening, or, receive, from a PW side, a MMRP packet sent by a remote device, where the MMRP packet includes the combination of the user VLAN and the user multicast MAC address acquired by a remote device from the TRILL control frame obtained by listening; and the second acquiring module 12 includes a fourth acquiring unit 114 configured to acquire a port identifier of a PW port receiving the MVRP packet or the MMRP packet to serve as the first port identifier.

Figure 8:
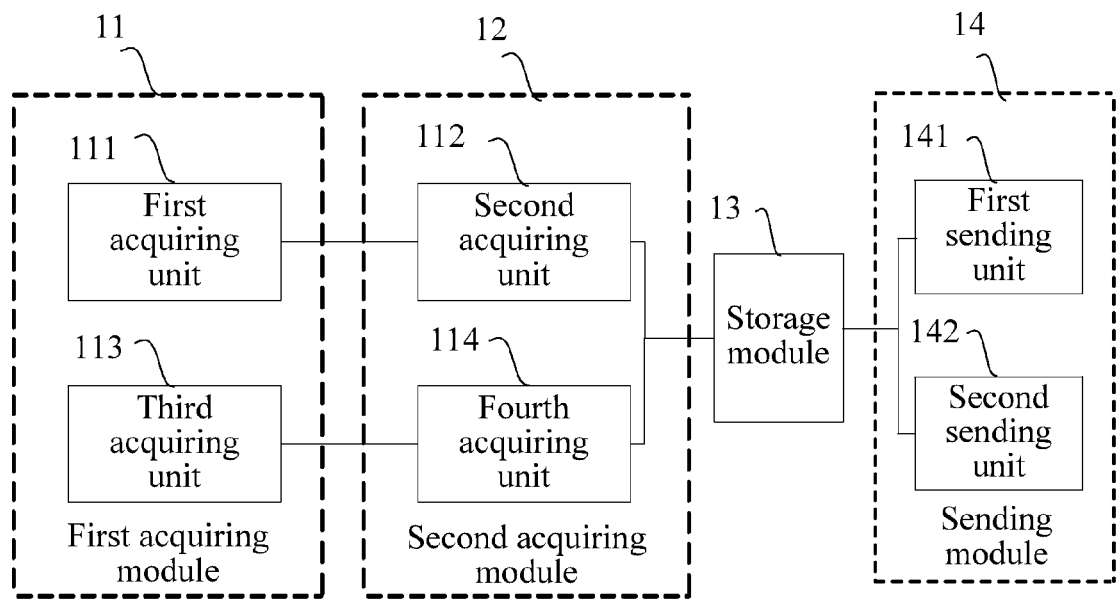
FIG. 8 is a schematic structural diagram of a third embodiment of an apparatus for sending a TRILL data frame according to the present invention.

FIG. 8 is a schematic structural diagram of a third embodiment of an apparatus for sending a TRILL data frame according to the present invention. As shown in FIG. 8, according to the apparatus in this embodiment based on a structure of the apparatus shown in FIG. 7, the sending module 14 may further include a first sending unit 141 configured to, in a case in which the received TRILL data frame is a broadcast data frame or an unknown unicast data frame, search, according to the user VLAN in the TRILL data frame, a forwarding table for a second port identifier corresponding to the user VLAN in the TRILL data frame, and forward the TRILL data frame from a PW port corresponding to the second port identifier; and a second sending unit 142 configured to, in a case in which the received TRILL data frame is a multicast data frame, search, according to the combination of the user VLAN and the user multicast MAC address in the TRILL data frame, the forwarding table for the second port identifier corresponding to the combination of the user VLAN and the user multicast MAC address in the TRILL data frame, and forward the TRILL data frame from the PW port corresponding to the second port identifier.

Figure 9:
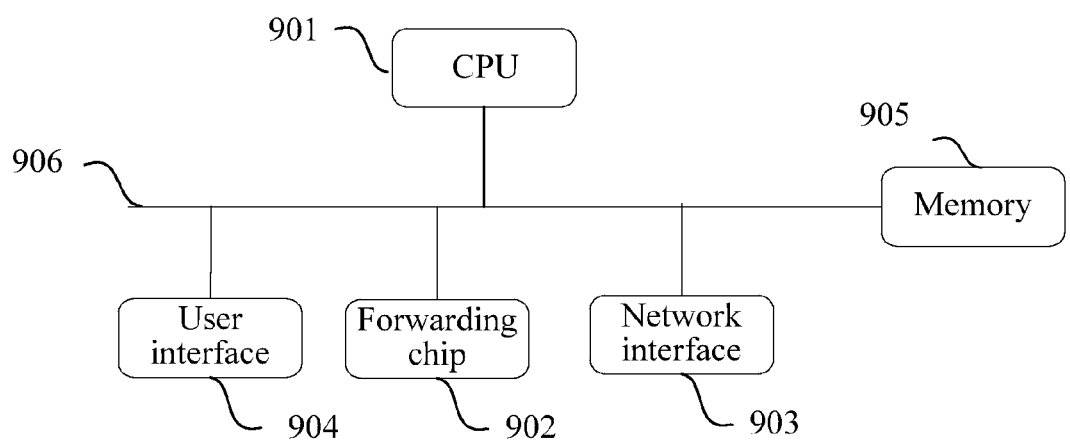
FIG. 9 is a schematic structural diagram of a fourth embodiment of an apparatus for sending a TRILL data frame according to the present invention.

FIG. 9 is a schematic structural diagram of a fourth embodiment of an apparatus for sending a TRILL data frame according to the present invention. As shown in FIG. 9, an apparatus 900 for sending a TRILL data frame in this embodiment includes at least one CPU 901, a forwarding chip 902, at least one network interface 903 or another user interface 904, a memory 905, and at least one communications bus 906. The communications bus 906 is configured to implement connection and communication between apparatuses. The apparatus 900 for sending a TRILL data frame optionally includes the user interface 904 which includes a display, a keyboard, or a clicking device. The memory 905 may include a high-speed random access memory (RAM), or may further include a non-volatile memory (NVM), for example, at least one disk memory. The memory 905 may optionally include at least one storage apparatus located far away from the CPU 901, where the storage apparatus stores various code, and is used for implementing various basic services and processing hardware-based tasks.

The CPU 901 executes, according to an indication of the code stored in the memory 905, the following actions: acquiring a user VLAN in a first protocol packet, or acquiring a combination of a user VLAN and a user multicast MAC address; acquiring a first port identifier of a PW port receiving the first protocol packet; and storing, in a forwarding table, a correspondence between the acquired user VLAN and the first port identifier or a correspondence between the combination of the user VLAN and the user multicast MAC address and the first port identifier.

The forwarding chip 902 is configured to, when a TRILL data frame is received, search, according to a user VLAN or a combination of a user VLAN and a user multicast MAC address in the TRILL data frame, the forwarding table for a second port identifier corresponding to the VLAN or the combination of the user VLAN and the user multicast MAC address in the TRILL data frame, and forward the TRILL data frame from a PW port corresponding to the second port identifier.

Further, the CPU 901 is configured to acquire, from a PW side, the user VLAN or the combination of the user VLAN and the user multicast MAC address in a TRILL control frame; acquire a port identifier of a PW port receiving the TRILL control frame, and use the port identifier of the PW port receiving the TRILL control frame as the first port identifier.

Further, the CPU 901 is configured to listen to a TRILL control frame including an interested VLAN and spanning tree roots Sub-TLV, and acquire the user VLAN from the TRILL control frame including the interested VLAN and spanning tree roots Sub-TLV; listen to a TRILL control frame including a multicast address Sub-TLV, and acquire the combination of the user VLAN and the user multicast MAC address from the TRILL control frame including the multicast address Sub-TLV; listen to a TRILL control frame including a fine grained label, and acquire a label pair from the TRILL control frame including the fine grained label to serve as the user VLAN; and listen to a TRILL control frame including a multicast fine grained label, and acquire a user fine grained label and a fine grained label group MAC address from the TRILL control frame including the multicast fine grained label to serve as the user VLAN and the user multicast MAC address.

Further, the CPU 901 is configured to receive, from the PW side, a MVRP packet sent by a remote device, where the MVRP packet includes the user VLAN acquired by the remote device from the TRILL control frame obtained by listening, or, receive, from the PW side, a MMRP packet sent by a remote device, where the MMRP packet includes the combination of the user VLAN and the user multicast MAC address acquired by the remote device from the TRILL control frame obtained by listening; and acquire a port identifier of a PW port receiving the MVRP packet or the MMRP packet to serve as the first port identifier.

Further, the forwarding chip 902 is configured to, in a case in which the received TRILL data frame is a broadcast data frame or an unknown unicast data frame, search, according to the user VLAN in the TRILL data frame, the forwarding table for the second port identifier corresponding to the user VLAN in the TRILL data frame, and forward the TRILL data frame from the PW port corresponding to the second port identifier; and the forwarding chip 902 is configured to, in a case in which the received TRILL data frame is a multicast data frame, search, according to the combination of the user VLAN and the user multicast MAC address in the TRILL data frame, the forwarding table for the second port identifier corresponding to the combination of the user VLAN and the user multicast MAC address in the TRILL data frame, and forward the TRILL data frame from the PW port corresponding to the second port identifier.

The apparatus 900 for sending a TRILL data frame provided in this embodiment includes a core component configured to process a service, and because of irrelevance to a specific objective of the implementation manners, the core component is not described herein again. An operating process of the apparatus for sending a TRILL data frame provided in this embodiment is similar to an operating process of the apparatus for sending a TRILL data frame in FIG. 7, which is not described herein again.

According to the method and apparatus for sending a TRILL data frame provided in the embodiments of the present invention, a PE acquires a user VLAN or a combination of a user VLAN and a user multicast MAC address in a TRILL control frame, and a port identifier of a PW port receiving the TRILL control frame, and stores, in a forwarding table, a correspondence between the acquired user VLAN and the port identifier or a correspondence between the combination of the user VLAN and the user multicast MAC address and the port identifier, so that when a TRILL data frame is received, the forwarding table is searched according to a user VLAN or a combination of a user VLAN and a user multicast MAC address in the data frame, to find a corresponding PW port, so as to forward the TRILL data frame only from the corresponding PW port after being copied, thereby avoiding a waste of bandwidth at a VPLS network side caused by broadcasting and copying, by the PE, the TRILL data frames from all remote devices at a PW side connected to the PE.

Persons of ordinary skill in the art may understand that all or a part of the steps of the method embodiments may be implemented by a program instructing relevant hardware. The foregoing program may be stored in a computer readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A method performed by a provider edge (PE) for sending a Transparent Interconnection of Lots of Links (TRILL) data frame, comprising:
   acquiring a first user virtual local area network (VLAN), or a combination of a first user VLAN and a first user multicast medium access control (MAC) address, in a first TRILL control frame received from a pseudo wire (PW) side of the PE;
   acquiring a first port identifier of first PW port receiving the first TRILL control frame;
   storing, in a forwarding table, a correspondence between the first user VLAN and the first port identifier or a correspondence between the combination of the first user VLAN and the first user multicast MAC address and the first port identifier; and
   searching, when a TRILL data frame is received from an attachment circuit (AC) side, according to a second user VLAN or a combination of the second user VLAN and the user multicast MAC address in the TRILL data frame, the forwarding table for a second port identifier corresponding to the VLAN or the combination of the user VLAN and the user multicast MAC address in the TRILL data frame, and
   forwarding the TRILL data frame from a second PW port corresponding to the second port identifier; and
   wherein the acquiring the first user VLAN or the combination of the first user VLAN and the first user multicast MAC address in the first TRILL control frame comprises the following:
   listening to a TRILL control frame comprising an interested VLAN and spanning tree roots subtype-length-value (Sub-TLV), and acquiring the first user VLAN from the TRILL control frame comprising the interested VLAN and spanning tree roots Sub-TLV;
   listening to a TRILL control frame comprising a multicast address Sub-TLV, and acquiring the combination of the first user VLAN and the first user multicast MAC address from the TRILL control frame comprising the multicast address Sub-TLV;
   listening to a TRILL control frame comprising a fine grained label Sub-TLV, and acquiring a label pair from the TRILL control frame comprising the fine grained label Sub-TLV to serve as the first user VLAN; and
   listening to a TRILL control frame comprising a fine grained label multicast address Sub-TLV, and acquiring a combination of a label pair and a user fine grained label multicast MAC address from the TRILL control frame comprising the fine grained label multicast address Sub-TLV to serve as the combination of the first user VLAN and the first user multicast MAC address.

2. The method according to claim 1, wherein searching, when the TRILL data frame is received, according to the VLAN or the combination of the user VLAN and the user multicast MAC address in the TRILL data frame, the forwarding table for the second port identifier corresponding to the VLAN or the combination of the user VLAN and the user multicast MAC address in the TRILL data frame, and forwarding the TRILL data frame from the second PW port corresponding to the second port identifier comprises:
   searching, according to the user VLAN in the TRILL data frame, the forwarding table for the second port identifier corresponding to the user VLAN in the TRILL data frame when the received TRILL data frame is a broadcast data frame or an unknown unicast data frame;
   forwarding the TRILL data frame from the second PW port corresponding to the second port identifier;
   searching, according to the combination of the user VLAN and the user multicast MAC address in the TRILL data frame, the forwarding table for the second port identifier corresponding to the combination of the user VLAN and the user multicast MAC address in the TRILL data frame, when the received TRILL data frame is a multicast data frame; and
   forwarding the TRILL data frame from the second PW port corresponding to the second port identifier.

3. The method according to claim 1, further comprising:
   receiving from an AC side, a second TRILL control frame comprising an interested VLAN and spanning tree roots Sub-TLV;
   acquiring a second user VLAN in the second TRILL control frame;
   adding the second user VLAN to a Multiple VLAN Registration Protocol (MVRP) packet; and
   broadcasting the MVRP packet to all remote PEs.

4. The method according to claim 1, further comprising:
   receiving from an AC side, a second TRILL control frame comprising an interested VLAN and spanning tree roots Sub-TLV;
   acquiring the combination of a second user VLAN and a second user multicast MAC address in the second TRILL control frame;
   adding the combination of the second user VLAN and the second user multicast MAC address to a Multiple MAC Registration Protocol (MMRP) packet; and
   broadcasting the MMRP packet to all remote PEs.

5. An apparatus used in a provider edge (PE) for sending a Transparent Interconnection of Lots of Links (TRILL) data frame, comprising:
   a central processing unit (CPU);
   a forwarding chip;
   a memory; and
   a communications bus, wherein the CPU executes, according to an indication of code stored in the memory, the following operations:

acquiring a first user virtual local area network (VLAN), or a combination of a first user VLAN and a first user multicast medium access control (MAC) address in a first TRILL control frame received from a pseudo wire (PW) side of the PE;

acquiring a first port identifier of a first PW port receiving the first TRILL control frame;

storing, in a forwarding table, a correspondence between the first user VLAN and the first port identifier or a correspondence between the combination of the first user VLAN and the first user multicast MAC address and the first port identifier; and wherein the forwarding chip is configured to:

search, when a TRILL data frame is received from an attachment circuit (AC) side, according to a second user VLAN or a combination of a second user VLAN and a second user multicast MAC address in the TRILL data frame, the forwarding table for a second port identifier corresponding to the second user VLAN or the combination of the second user VLAN and the second user multicast MAC address in the TRILL data frame; and forward the TRILL data frame from a second PW port corresponding to the second port identifier;

wherein the acquiring the first user VLAN or the combination of the first user VLAN and the first user multicast MAC address in the first TRILL control frame comprises the following;

listening to a TRILL control frame comprising an interested VLAN and spanning tree roots subtype-length-value (Sub-TLV), and acquiring the first user VLAN from the TRILL control frame comprising the interested VLAN and spanning tree roots Sub-TLV;

listening to a TRILL control frame comprising a multicast address Sub-TLV, and acquiring the combination of the first user VLAN and the first user multicast MAC address from the TRILL control frame comprising the multicast address Sub-TLV;

listening to a TRILL control frame comprising a fine grained label Sub-TLV, and acquiring a label pair from the TRILL control frame comprising the fine grained label Sub-TLV to serve as the first user VLAN; and listening to a TRILL control frame comprising a fine grained label multicast address Sub-TLV, and acquiring a combination of a label pair and a user fine grained label multicast MAC address from the TRILL control frame comprising the fine grained label multicast address Sub-TLV to serve as the combination of the first user VLAN and the first user multicast MAC address.

6. The apparatus according to claim 5, wherein searching, when the TRILL data frame is received, according to the VLAN or the combination of the user VLAN and the user multicast MAC address in the TRILL data frame, the forwarding table for the second port identifier corresponding to the VLAN or the combination of the user VLAN and the user multicast MAC address in the TRILL data frame, and forwarding the TRILL data frame from the second PW port corresponding to the second port identifier comprises:

searching, according to the user VLAN in the TRILL data frame, the forwarding table for the second port identifier corresponding to the user VLAN in the TRILL data frame, when the received TRILL data frame is a broadcast data frame or an unknown unicast data frame;

forwarding the TRILL data frame from the second PW port corresponding to the second port identifier;

searching, according to the combination of the user VLAN and the user multicast MAC address in the TRILL data frame, the forwarding table for the second port identifier corresponding to the combination of the user VLAN and the user multicast MAC address in the TRILL data frame, when the received TRILL data frame is a multicast data frame; and forwarding the TRILL data frame from the second PW port corresponding to the second port identifier.

7. The apparatus according to claim 5, wherein the CPU further executes the following operations:

receiving from an AC side, a second TRILL control frame comprising an interested VLAN and spanning tree roots Sub-TLV;

acquiring a second user VLAN in the second TRILL control frame; and adding the second user VLAN to a Multiple VLAN Registration Protocol (MVRP) packet; and wherein the forwarding chip is further configured to:

broadcast the MVRP packet to all remote PEs.

8. The apparatus according to claim 5, wherein the CPU further executes the following operations:

receiving from an AC side, a second TRILL control frame comprising an interested VLAN and spanning tree roots Sub-TLV;

acquiring the combination of a second user VLAN and a second user multicast MAC address in the second TRILL control frame; and adding the combination of the second user VLAN and the second user multicast MAC address to a Multiple MAC Registration Protocol (MMRP) packet; and wherein the forwarding chip is further configured to:

broadcast the MMRP packet to all remote PEs.

* * * * *